United States Patent [19]
Stiebel

[11] 3,845,375
[45] Oct. 29, 1974

[54] ELECTRONIC ROTATIONAL SENSOR

[75] Inventor: Ariel I. Stiebel, Bloomfield Hills, Mich.

[73] Assignee: McLaughlin, Ward & Co., Jackson, Mich.

[22] Filed: Nov. 9, 1973

[21] Appl. No.: 414,503

[52] U.S. Cl. ............... 318/463, 318/480, 318/313, 318/327, 198/40, 198/232, 317/13 R
[51] Int. Cl. ............................................ H02h 7/85
[58] Field of Search ........... 318/446, 456, 461, 463, 318/464, 480, 313, 318, 327; 317/13 R; 198/40, 232

[56] References Cited
UNITED STATES PATENTS

| | | | |
|---|---|---|---|
| 3,341,837 | 9/1967 | Washington | 198/40 X |
| 3,389,321 | 6/1968 | Miller et al. | 318/463 |
| 3,536,977 | 10/1970 | Porter | 318/461 |
| 3,564,337 | 2/1971 | MacGeorge | 318/327 X |
| 3,691,440 | 9/1972 | Haddock | 318/327 X |
| 3,732,477 | 5/1973 | Cicatelli | 318/463 |
| 3,745,436 | 7/1973 | Buttafava | 318/327 X |

*Primary Examiner*—B. Dobeck
*Attorney, Agent, or Firm*—Beaman & Beaman

[57] ABSTRACT

A circuit for sensing the rotational rate of electric motor driving apparatus, such as a conveyor or material handler, wherein the motor driving the apparatus is deenergized upon the apparatus rate of rotation decreasing below permissible limits. A pulsating electronic signal having a frequency determined by the rotating apparatus is created by electronic light sensing means and the pulsating signal is modified to create pulses of equal duration. Charging means in the form of capacitors produce a ramp voltage at a rate proportional to the rate of apparatus rotation, and is discharged by an SCR controlled by the modified signal. Upon the ramp voltage increasing beyond a predetermined level, electronic switch means are energized operating a relay which deenergizes the motor circuit. Bypass switch means are employed to permit manual starting of the motor to obtain an operational rate of rotation.

8 Claims, 1 Drawing Figure

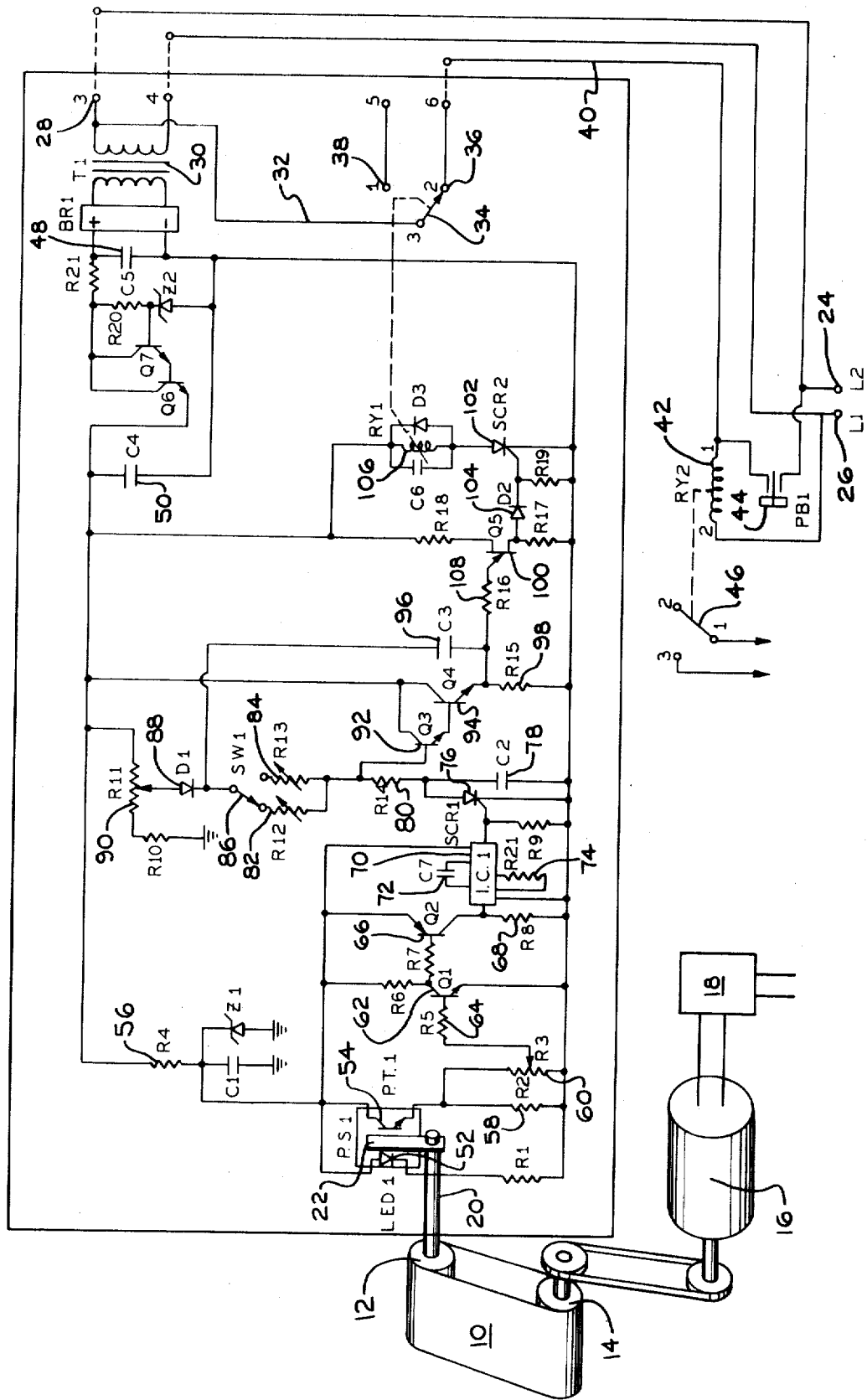

ELECTRONIC ROTATIONAL SENSOR

BACKGROUND OF THE INVENTION

The invention pertains to an electronic motor control system utilizing a pulsed electrical signal to control the rate of charging of a capacitor wherein the buildup of voltage due to a decrease in the frequency of the pulsed circuit operates a motor control switch.

In the material handling arts, wherein bulk materials are elevated or transported by feed screws, conveyor belts, bucket chains and the like, safety control devices are often used to indicate malfunctioning. Such control devices are usually automatic requiring no attention by an operator, and in many instances the material handling device is not visible to the operator. Accordingly, various types of electrical control devices have been developed as typified in U.S. Pat. Nos. 1,869,883; 2,472,526; 2,493,591 and 3,536,977. In such prior art devices various means are used to sense the rate of rotation of the conveyor shafts, or motor, and the control circuits of prior art devices are relatively expensive to manufacture and relatively inflexible with respect to the ability to adjust the operating characteristics, and have not proven dependable over long periods of use.

As such safety motor controlled devices as used to sense the underspeed of conveyors and motors must function perfectly over long periods of time without attention, various devices have been used to sense the rate of movement of motor or conveyor apparatus. Such sensing devices must be capable of operating millions of cycles without malfunctioning. Mechanical sensing devices for producing electric signals, such as limit switches, contact levers, reed switches, and the like may malfunction over long periods of life, and the dependability of an all electronic motor control circuit for this type of application is highly desirable.

Electronic motor control circuits utilizing light emitting diodes and light sensitive resistances are known, and reference is made to U.S. Pat. Nos. 3,475,676 and 3,691,440. Such devices use shielding means moved by a rotating motor driven member to interrupt the light path between the aforementioned light sensing elements to produce a pulsed signal, and while such devices have proven to be operational over long periods of time, the flexibility of adjustment desired wherein variable rates of rotation may be sensed, and known circuits, have not met all of the prerequisites of this type of control.

SUMMARY OF THE INVENTION

It is an object of the invention to provide a motor control circuit particularly useful in the material handling arts wherein motor driven apparatus underspeed, such as occurring from conveyor overload, breakage or malfunctioning, may be immediately sensed and the motor stopped.

A further object of the invention is to provide a motor underspeed control circuit utilzing light sensing components interrupted at a rate proportional to the motor driven apparatus rotation wherein the drive motor is deenergized upon the rate of apparatus rotation falling to a predetermined level, and the motor may only be reenergized by manual attention.

Another object of the invention is to provide an electronic motor control of the aforementioned type wherein the characteristics of the circuit, in particular, the rotational rate at which the motor is deenergized, may be readily adjusted and predetermined.

In the practice of the invention a pulsed current is produced by a shield periodically interrupting a light path between a light emitting diode and a phototransistor. The pulsed signal is amplified and is modified to produce pulses of uniform duration, but at a frequency determined by the rate of apparatus rotation. Such modified pulses are employed to operate an SCR switch which discharges charging capacitors charging at a predetermined rate, which may be adjusted. The capacitors produce a ramp voltage through an amplifier and pulse shaper circuit producing a ramp voltage which rises linearly rather than expotentially, to produce a very precise voltage increase. If the capacitors are not periodically discharged an unijunction senses the voltage level at a predetermined magnitude operating a relay which deenergizes the motor. The motor may not be reenergized except through manual attention by the operator.

BRIEF DESCRIPTION OF THE DRAWINGS

The aforementioned objects and advantages of the invention will be appreciated from the following description and the drawing FIGURE representing the preferred circuit of the invention, the motor being controlled, and the conveying device operated thereby, being schematically illustrated.

DESCRIPTION OF PREFERRED EMBODIMENT

With reference to the figure, a belt conveyor is schematically represented at 10, and is mounted upon rotatably supported rollers 12 and 14. The roller 14 includes a drive shaft and pulley which is belted to a pulley attached to the armature of electric motor 16. Electric motor 16 is operated by a conventional motor starter 18 having supply and control leads. The conveyor roller 12 includes a shaft 20 upon which a shield 22 in the form of a radial element is mounted. As the roller 12 is rotated by the conveyor, the shield 22 rotates and is so located as to rotate through, and interrupt, a light path defined by the components of a motor control circuit as hereinafter described.

The motor starter circuit includes conductors and terminals 24 and 26 from the motor starter, and as will be appreciated from the diagram, conductor 24 is connected to a terminal 28 of transformer 30, to which conductor 32 is connected leading to relay controlled switch 34. The switch 34 is shiftable between terminals 36 and 38, and in the FIGURE the switch position is illustrated connecting conductor 32 to conductor 40 connected to relay coil 42, in turn connected to terminal 26. A push button bypass switch 44 is connected to conductor 24 directly permitting energizing of the relay coil 42, and coil 42 operates switch 46 shiftable between open and closed conditions to operate the electric motor starter 18.

The transformer 30 includes an output circuit whereby the AC voltage is rectified. The resultant DC output voltage is zener controlled and filtered by capacitors 48 and 50. This DC voltage is accurately held to close tolerances by the illustrated rectifying circuitry, of conventional nature, as the DC voltage governs the rise of the ramp voltage as will be later described.

The motor control circuit includes a light emitting diode 52 located in proximity to the photo transistor 54, and the light path defined by the light emitting from the diode 52 is periodically interrupted by the shield 22 mounted upon the conveyor roller 12. Thus, current flowing through the photo transistor 54 is interrupted once during each revolution of the conveyor roller causing a pulsation in the current flow through resistance 56, photo transistor 54, and parallel resistances 58 and 60.

The circuit includes a transistor 62, and the portion of the voltage drop across resistances 58 and 60 causes a current to flow through resistance 64 into the base of the transistor 62. The potentiometer resistor 60 permits a sensitivity control for the photo transistor 54.

Transistors 62 and 66 function as an amplifier and a pulse shaper, respectively. For each positive pulse received by transistor 62, a positive pulse is produced in resistor 68 being the collector resistor of transistor 66. Pulses across resistance 68 are of the same amplitude, though not necessarily of the same pulse width. A monostable multivibrator 70, such as a Signetics N74121, is connected to the collector of transistor 66 and functions to provide pulses of equal duration even though the input pulses into the multivibrator may be of different durations. Thus, the output of multivibrator has pulses of equal duration, but the frequency of the pulsations will be dependent upon the rate of rotation of the roller 12, and the frequency of interruption of the light path between light emitting diode 52 and photo transistor 54. The pulse duration of the output of multivibrator 70 is determined by the timing capacitor 72 and the timing resistor 74.

The output of the multivibrator 70 is used to control an SCR 76 which functions as a switch to discharge capacitor 78. The capacitor 78 which is connected across SCR 76 is also in series with resistor 80, one of the variable resistors 82 or 84, switch 86, diode 88, and potentiometer 90. The base of transistor 92 is connected at the junction of resistances 80 and either resistors 82 or 84, and transistor 94 will charge capacitor 96 to a voltage as proportional to the voltage at the base of transistor 92.

The emitter of transistor 94 is connected to ground through resistance 98, and the junction is connected to the base of unijunction 100 which fires at a precise gate voltage level. The unijunction 100 controls SCR 102 through diode 104, which in turn causes a switching of the relay coil 106 operating switch 34.

Operation is as follows:

Rotation of the roller 12, and shield 22 produces a pulsating current to the amplifying and shaping transistors 62 and 66 due to the interruption of the light emitting diode light path. This pulsating amplified current passes through multivibrator 70 wherein the pulses are formed of equal duration, and employed to control SCR 76. Capacitor 78 charges to the supply voltage through potentiometer 90, diode 88, switch 86, either resistor 82 or 84 and resistor 80. The charging of the capacitor 78 occurs as long as SCR 76 is not conducting. When SCR 76 fires, capacitor 78 will discharge through the SCR to almost ground potential. Resistor 80 functions as a limiting resistor so that under any setting of the potentiometers 90, 82 and 84 the current through SCR 76 cannot exceed a dangerous level, and thus these resistors protect the SCR.

The base voltage of transistor 92 equals the potential which is present in capacitor 78 during the charging cycle. This voltage causes a current to flow into transistors 92 and 94 which are connected in an emitter follower arrangement. Thus, the voltage across resistor 98 will reflect this voltage less the voltage drops across transistors 92 and 94. Connecting capacitor 96 from the emitter of transistor 94 to diode 88 causes this voltage to rise linearly, rather than expotentially, thus creating a very precise ramp voltage. This ramp voltage will continue to rise as long as capacitor 78 is allowed to charge. As soon as capacitor 78 discharges through SCR 76 the ramp voltage drops to approximately ground potential.

The rise of the ramp voltage is governed by potentiometer 90 which applies different start voltages to the capacitor charge circuit, and the resistances 82, 84 and 80, the resistance to the charging current. The ramp voltage is fed through resistance 108 into the gate of unijunction 100. When the ramp voltage rises to the predetermined firing voltage of the unijunction gate level, the unijunction will fire and transmit a current pulse into the gate of SCR 102. SCR 102 then fires and energizes the relay coil 106. Since SCR 102 is fed a DC current through the relay coil, relay coil 106 stays in its locked position until the reset action is initiated.

The ramp voltage will not normally rise to the gate level of the unijunction 100 due to the discharging of capacitor 78 occurring through SCR 76. However, should the rate of rotation of the roller 12 and the shield 22 fall below a predetermined level, the ramp voltage will increase, causing the unijunction to close the SCR 102, and actuate the coil to shift switch 34 to the open condition deenergizing motor 16.

The opening of switch 34, of course, deenergizes relay coil 42, shifting the switch 46 to an open condition, opening the circuit to motor 16.

To start the motor 16 the push button 44 is manually closed, bypassing transformer 30 and switch 34. The closing of push button switch 44 energizes coil 42 and closes switch 46. Upon the motor, and conveyor, attaining operational speed, the push button 44 may be released and the switch 34 may be manually reset to the closed condition.

Preferably, the potentiometer 90 is calibrated in revolutions per minute, and the operator may readily adjust the circuitry between two ranges as determined by a selection made by the manually operated switch 86 to utilize either resistors 82 or 84. For instance, at one position of the switch 34 motor operation occurs between 10 and 100 RPM, while at the other position of the switch, motor operation occurs between 100 RPM and 1000 RPM. Should the motor operation fall below the minimum level for the selected range, the switch 34 will be opened due to the buildup of the ramp voltage, as described.

By way of example, the described components of an embodiment of the invention have the following values or specifications:

| Capacitor | 48 | 1 MFD |
|---|---|---|
| do. | 50 | 35 MFD |
| do. | 72 | .2 MFD |
| do. | 78 | 1 MFD |
| do. | 96 | 20 MFD |
| Resistor | 56 | 2.2K |
| do. | 58 | 10K |
| do. | 60 | 10K |

| | -Continued | |
|---|---|---|
| do. | 64 | 100K |
| DO) | 68 | 4.7K |
| do. | 74 | 10K |
| do. | 80 | 1K |
| do. | 82 | 100K |
| do. | 84 | 1M |
| do. | 108 | 1K |
| Light Emitting Diode | 52 | MCA-7) |
| Photo Transistor | 54 | MCA-7) ) One Unit |
| SCR | 76 | 2N1595 |
| SCR | 102 | 2N1595 |
| Diode | 88 | 1N4002 |
| do. | 104 | 1N4002 |
| Unijunction | 100 | 2N2646 |

It will be appreciated that various modifications to the inventive concept may be apparent to those skilled in the art without departing from the spirit and scope of the invention.

I claim:

1. A rotation sensing electric motor control for motor driven apparatus comprising, in combination, signal producing means producing a pulsating current flow having a frequency output proportional to the rate of rotation of the apparatus driven by the electric motor to be controlled and a variable pulse width, pulse durationequalizing means connected to said frequency output equalizing the duration of the pulse widths of said frequency output, voltage charging means connected to a constant supply voltage and charging at a predetermined rate producing a ramp voltage, discharge means connected to said voltage charging means controlling the discharge thereof and controlled by and connected to the output of said pulse duration equalizing means, ramp voltage sensing means connected to and controlled by said ramp voltage producing a control signal upon said ramp voltage attaining a predetermined value, and motor switch means connected to said ramp voltage sensing means operated by said control signal whereby said motor switch means is actuated to a motor deenergizing position upon the frequency of said pulsating current falling below the predetermined rate necessary to operate said discharge means and prevent said ramp voltage from attaining a value sufficient to produce said control signal and operate said switch means.

2. In a rotation sensing electric motor control as in claim 1, amplifying means connected to said frequency output and amplifying said output.

3. In a rotation sensing electric motor control as in claim 1 wherein said signal producing means includes light emitting means and light sensing means receiving light from said light producing means, and a light shield operated by the motor driven apparatus being controlled interrupting the light path between said light emitting and sensing means at a rate proportional to the rate of rotation of the apparatus.

4. In a rotation sensing electric motor control as in claim 1 wherein said pulse duration equalizing means comprises a monostable multivibrator.

5. In a rotation sensing electric motor control as in claim 1 wherein said charging means comprises a capacitor and said discharge means comprises an SCR connected in parallel with said capacitor.

6. In a rotation sensing electric motor control as in claim 5, first and second resistances of different values in parallel with each other and in series with said capacitor, and switch means selectively connecting one of said resistances across said capacitor to permit adjustment of the duration of the rate of increase of said ramp voltage.

7. In a rotation sensing electric motor control as in claim 1 wherein said ramp voltage sensing means includes a unijunction and an SCR and said motor switch means includes a relay operated by said SCR.

8. In a rotation sensing electric motor control as in claim 1, wherein said motor switch means includes a first relay directly controlled by said ramp voltage sensing means, a motor starter, a second relay operating said motor starter in series with said first relay, and a bypass switch directly connecting said second relay to a power source bypassing said first relay to permit the motor to attain an operating speed.

* * * * *